United States Patent [19]

Jeffery

[11] 4,306,242
[45] Dec. 15, 1981

[54] LASER RECORDING SYSTEM

[75] Inventor: Edwin A. Jeffery, Natick, Mass.

[73] Assignee: Data General Corporation, Westboro, Mass.

[21] Appl. No.: 131,528

[22] Filed: Mar. 18, 1980

[51] Int. Cl.³ .............................................. G01D 15/10
[52] U.S. Cl. ....................................... 346/1.1; 346/108
[58] Field of Search ............ 346/1.1, 108, 109, 110 R, 346/110 V; 350/6.8; 358/292, 300, 302, 288, 293, 296

[56] References Cited

U.S. PATENT DOCUMENTS

| | | | |
|---|---|---|---|
| 3,389,403 | 6/1968 | Cottingham et al. | 346/108 |
| 3,441,949 | 4/1969 | Rolon | 346/108 |
| 4,144,539 | 3/1979 | Davie et al. | 346/108 X |
| 4,212,018 | 7/1980 | Ohnishi et al. | 346/108 X |
| 4,234,931 | 11/1980 | Kanaiwa et al. | 346/108 X |

*Primary Examiner*—L. T. Hix
*Assistant Examiner*—W. J. Brady
*Attorney, Agent, or Firm*—Jacob Frank; Joel Wall; Irving M. Kriegsman

[57] ABSTRACT

A laser recording system is disclosed in which a beam of light from a laser is split into first and second beams. The first beam is modulated with digital signals from a computer and deflected by a rotating mirror onto the surface of a photoconductive drum. The second beam is deflected by the rotating mirror onto a curved timing plate. The surface of the timing plate is provided with a series of unevenly spaced reflective markings representative of evenly spaced spot positions on the surface of the drum. Light reflected by the timing plate as the second beam scans its surface and strikes the reflective markings impinges on a photodetector located at the center of curvature of the timing plate and is converted by the photodetector into a corresponding series of electrical signals. The electrical signals are converted into pulses which are used to gate the flow of digital signals from the computer so that the light spots formed on the drum by the first beam are evenly spaced and not effected in their placement by the changing angular velocity of the first beam as it is swept across the drum.

13 Claims, 2 Drawing Figures

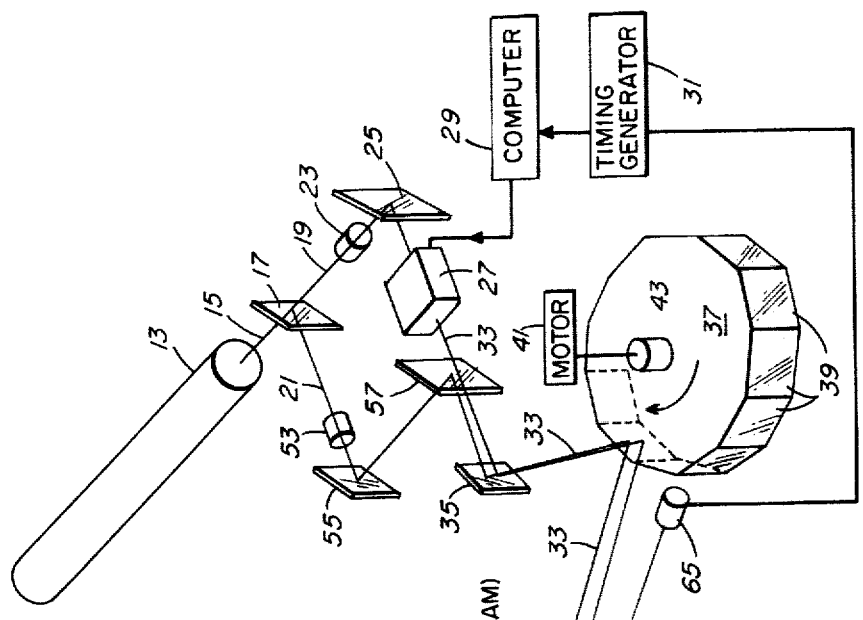
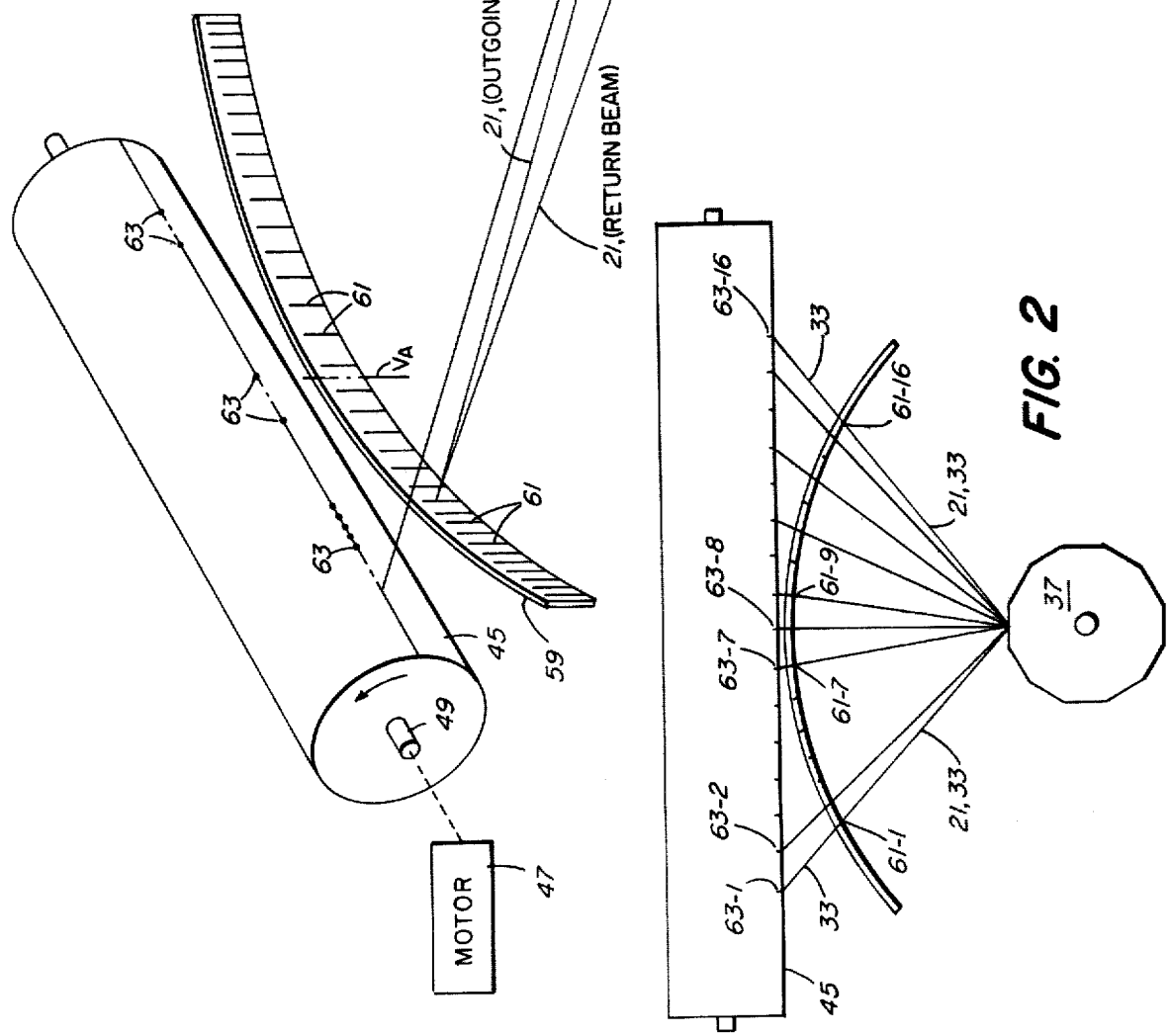
FIG. 1
FIG. 2

LASER RECORDING SYSTEM

BACKGROUND OF THE INVENTION

The present invention relates generally to laser recording systems in which a digitally modulated laser beam is deflected by a rotating mirror onto a flat recording surface and more particularly to a novel arrangement for generating timing signals for compensating for changes in the angular velocity of the swept beam.

Recording systems which employ a laser for transferring digital information from a computer to a light sensitive recording surface are well known to those skilled in the art. Generally, such systems rely on a laser beam which is deflected by a rotating mirror, or other type of scanning device, and modulated in accordance with digital data trains representative of positive and negative areas or various optical densities or grey levels to be reproduced on the recording surface. In normal operation, the recording surface is moved either continuously or in a stepping manner as it is being swept by the digitally modulated laser beam.

In order to accommodate the use of a rotating light beam, the recording surface is often maintained in a concave configuration over the area that is scanned by the light beam. An example of this type of laser recording system may be found in U.S. Pat. No. 4,054,928 to J. C. Butler etc. wherein the recording medium is supported on a curved platen. Examples of laser recording systems wherein the recording surface is maintained in a concave configuration but wherein the laser beam is modulated with analog signals rather than digital signals may be found in U.S. Pat. No. 3,154,621 to W. R. Hohnson, U.S. Pat. No. 3,816,652 to G. B. Barnett and U.S. Pat. No. 3,874,621 to L. R. Blair etc.

In many instances, it is either not possible or not desirable to maintain the recording surface in a concave configuration over the area that is scanned by the rotating light beam. For example, the laser recording system may be one in which the recording medium is a photoconductive drum whose cylindrical shape is rigid and cannot be altered. As the rotating light beam is swept across the drum, the surface that is exposed to the light beam is substantially straight or flat. An example of a laser recording system in which a digitally modulated laser beam is swept across the surface of a photoconductive drum may be found in U.S. Pat. No. 4,124,286 to S. Barasch.

As is known, a train of digital signals is linear; that is, the series of pulses are evenly spaced from one another. However, if a rotating light beam is used to transfer digital signals to a recording surface and the recording surface is flat at the area exposed to the light beam, the light spots that are produced on the recording surface corresponding to the digital signals will be unevenly spaced because of the changing angular velocity of the beam as it sweeps across the surface.

For many applications, the distortions resulting from the uneven placement of the light spots are not acceptable.

One prior art technique for compensating for the changing angular velocity of a rotating light beam as it is swept across a flat surface and thereby avoiding the distortions is to incorporate a special lens system which is designed to make the necessary corrections. Some of the problems with this approach are that the lens system that is needed for this purpose is fairly complex, somewhat cumbersome and somewhat costly to manufacture. An example of a laser recorder employing a compensating lens system of this type may be found in the November 1979, issue of the Bell System Technical Journal.

Another prior art technique for compensating for the changing angular velocity of a rotating light beam as it is swept across a flat surface is to generate timing signals which are used to control the flow of the digital data used to modulate the laser beam so that the light spots corresponding to the digital signals evenly spaced on the flat surface. Although a number of different arrangements have been proposed or actually reduced to practice for generating the timing signals, none of the arrangements have proven to be entirely adequate or satisfactory.

For example, in U.S. Pat. No. 3,389,403 to J. M. Cottingham there is disclosed a data plotter in which timing signals are generated for this purpose by deflecting an auxiliary light beam across a hollow bar having a series of evenly spaced slots. Light entering the bar through the slots is sensed by a photodiode located at one end of the bar. In the November 1979, issue of Bell System Technical Journal, there is disclosed an arrangement for generating timing signals by deflecting an auxiliary light beam across a flat code plate having a series of evenly spaced light transmissive portions. Light passed through the transmissive portions of code plate is collected by a lens located behind the code plate and directed into a suitably positioned phototube.

SUMMARY OF THE INVENTION

According to the teachings of this invention, there is provided a laser recording system in which a first beam of laser light is modulated with digital signals and swept across a flat recording surface by a rotating mirror. A second beam of laser light also impinges on the rotating mirror and is deflected by the rotating mirror onto a curved timing plate. The surface of the timing plate is provided with a series of unevenly spaced reflective markings representative of evenly spaced spot positions on the recording surface. Light reflected by the timing plate each time the rotating second beam strikes one of the reflective markings impinges on a photodetector located at the center of curvature of the timing plate and is converted by the photodetector into a series of electrical signals. The electrical signals are converted to electrical pulses which are used to gate the flow of digital signals used to modulate the first beam so that the light spots formed on the recording surface corresponding to the digital signals are evenly spaced and not effected in their placement by the changing angular velocity of the first light beam as it is swept across the recording surface.

It is therefore an object of this invention to provide a new and improved laser recording system.

It is another object of this invention to provide a laser recording system in which a modulated laser beam is swept across a flat recording surface by a rotating scanning device and which includes means capable of compensating for the variances in angular velocity of the modulated beam as it is swept across the flat recording surface.

It is still another object of this invention to provide a laser recording system which enables digital signals to be recorded on a flat recording surface by a rotating laser beam without distortion.

It is yet still another object of this invention to provide a laser recording system which includes means for compensating for changes in angular velocity of the writing beam that is compact and reliable in operation.

It is a further object of this invention to provide a laser recording system employing a rotating digitally modulated laser beam and a flat recording system and which includes a novel technique for generating timing signals for controlling the flow of modulating signals.

It is another object of this invention to provide a laser recording system having means for compensating for changes in angular velocity of the writing beam as it is swept across a flat recording surface which is economical to fabricate and lends itself to standard mass producing manufacturing techniques.

It is yet still another object of this invention to provide a laser recording system in which a digitally modulated laser beam is swept across the surface of a photoconductive drum by a rotating mirror and which includes a new and novel means for generating timing signals to compensate for changes in the angular velocity of the swept beam.

For a better understanding of the present invention together with other and further objects thereof, reference is made to the following description taken in conjunction with the accompanying drawings and its scope will be pointed out in the appended claims.

DESCRIPTION OF THE DRAWINGS

In the drawings wherein like reference numerals represent like parts:

FIG. 1 is a pictorial, schematic representation of a laser recording system constructed according to the teachings of this invention; and FIG. 2 is a plan view of the photconductive drum, the rotating mirror and the timing plate of the laser recording system of FIG. 1 illustrating the non-linear placement of the reflective markings on the timing plate and the corresponding linear placement of the spot positions on the photoconductive drum.

DETAILED DESCRIPTION OF THE PREFERRED EMBODIMENT

Referring now to the drawings, there is illustrated in FIG. 1, a laser recording system identified generally by reference numeral 11. Since laser recording systems are well recognized in the art, the description set forth hereinbelow will only set forth with specificity those elements necessary for an adequate understanding of the invention.

Laser recording system 11 includes a continuous wave laser 13, such as a helium neon laser, for producing a continuous, collimated beam of light 15 and a beamsplitter 17 for splitting the beam of light 15 into first and second beams designated by reference numerals 19 and 21 respectively. First beam 19 is used as a "writing" beam and second beam 21 is used as a "tracking" beam to generate timing signals for controlling the flow of modulating signals to first beam 19, as will be hereinafter described. First light beam 19 is passed through a beam shrinking lens 23 which reduces its size to the diameter desired for the light spots to be subsequently formed and is then deflected by a mirror 25 through a modulator 27, such as an acousto-optical modulator. Modulator 27 is controlled by digital signals received from a computer 29. The flow of digital signals from computer 29 to modulator 27 is gated by a timing generator 31.

The digitized beam of light 33 emerging from modulator 27 is deflected off of a mirror 35 onto a rotating polygon mirror 37 having a plurality reflective surfaces 39. Mirror 37 is mounted on a shaft 41 which is driven by a constant speed motor 43.

Light beam 33 that is deflected by mirror 37 impinges on the surface of a cylindrical photoconductive drum 45. The surface of drum 45 may be made of any suitable photosensitive material such as selenium or cadmium sulfide. Drum 45 is rotated by a motor 47 operably attached to its axial shaft 49.

As can be appreciated as modulated light beam 33 is swept across the surface of drum 45 by mirror 37 in a direction parallel to the longitudinal axis of drum 45, the surface of drum 45 that is scanned by light beam 33 is essentially flat. In order to compensate for the non-linear effect resulting from sweeping a flat surface with a rotating light beam, the timing signals generated by the timing generator 31 to control the flow of digital signals from computer 29 to modulator 27 are arranged such that the resulting light spots formed on the surface of drum 45 are evenly spaced.

The manner of generating the timing signals will now be described.

Second light beam 21, which in FIG. 1 is the light beam reflected by beamsplitter 17, is passed through a beam shrinking lens 53 similar to beam shrinking lens 23 and is then deflected by a pair of mirrors 55 and 57 to mirror 35 and then deflected by mirror 35 to polygon mirror 37. Mirror 55 is tilted slightly forward so that beam 21 impinges on mirror 37 at a point in vertical alignment with the point of impingement of beam 33, but slightly below the point of impingement of beam 33, as shown.

Beam 21 that is reflected by mirror 37 impinges on a curved, circular arc shaped, timing plate 59. Thus, at the same time as beam 33 is swept across drum 45, beam 21 is swept across timing plate 59. Timing plate 59 is positioned relative to polygon mirror 37 so that its midpoint is at the center position of the sweep of beam 21. Timing plate 59 may be made of any suitable material, such as aluminum or plastic, and is provided with a plurality of unevenly spaced reflective markings 61 corresponding to evenly spaced spot positions 63 on drum 45. The reflective markings 61 are separated by non-reflective areas which may either be light transmissive or light absorbing. Timing plate 59 is positioned relative to polygon mirror 37 so that its center of curvature is at or very close to the center of rotation of beam 21. The number of reflective markings 61 on timing plate 59 is equal to the number of light spots 63 which are to be formed on drum 45 during the course of one sweep of beam 33. Since swept beam 21 is lower than swept beam 33, timing plate 59 is conveniently positioned underneath drum 45, as shown.

Light reflected from timing plate 59 as light beam 21 is swept across its surface and impinges on the reflective markings 61, impinges on a photodetector 65 which is suitably located at or close to the center of curvature of timing plate 59. In order to prevent photodetector 61 from physically interferring with outgoing beam 21, and at the same time allow photodetector 65 to be positioned around the center of curvature of timing plate 59, timing plate 59 is tilted slightly forward so that the returned beam 21 is below the outgoing beam 21. In addition, timing plate 59 may be rotated slightly about its vertical axis $V_A$ so that the returned beam 21 is displaced to one side of the outgoing beam 21, as shown.

Thus, timing plate 59 provides a means for generating light pulses corresponding to evenly spaced spot positions on drum 45 and also, because of its arcuate shape, directs the reflected light pulses from each reflective marking 61 to a common point where they can be conveniently sensed. The light pulses impinging on photodetector 65 are converted by photodetector 65 into corresponding electrical signals which are transmitted to timing generator 31.

Referring now to FIG. 2, there is illustrated a plan view of the mirror 37, drum 45 and timing plate 59 shown in FIG. 1. As can be seen, timing plate 59 contains a plurality of reflective markings labelled 61-1 through 61-16, the particular number of markings shown being for illustrative purposes only. Each reflective marking 61 is positioned for use in conjunction with a corresponding spot position 63 on drum 45, the spot positions being numbered 63-1 through 63-16 in the same order. Thus, as light beam 21 sweeps across timing plate 59, light beam 33 sweeps across drum 45 and when light beam 21 is at one of the reflective markings, such as reflective marking 61-4, light beam 33 is at the corresponding spot position 63-4. Reflective markings 61 are unevenly spaced on timing plate 59 so that all of the spot positions are evenly spaced. As can be seen, the distance between reflective markings 61-7 and 61-8, for example, is greater than the distance between reflective markings 61-4 and 61-5 and the distance between reflective markings 61-4 and 61-5 is greater than the distance between reflective markings 61-1 and 61-2.

Timing plate 59 may be made by computer generating a pattern or series of unevenly spaced markings on a photoresist coated aluminized mylar strip, etching away the portions between the reflective markings and then bending the strip to a curved shape.

It is further emphasized that in some cases the digital information will be represented by the lack of a spot on drum 45. Whether or not an actual spot is formed on drum 45 is dependent on the particular digital signal. It is essential, however, that a linear representation of the appropriate signal on drum 45 be recorded (by the presence or absence of a spot).

Although this invention has been described with reference to a particular embodiment, it will be understood to those skilled in the art that this invention is also capable of further and other embodiments within the spirit and scope of the appended claims.

What is claimed is:

1. A method of generating timing signals for compensating for changes in the angular velocity of a rotating modulated laser beam as it is swept across a flat recording surface so that the pattern of light spots formed on said flat recording surface by said modulated laser beam are evenly spaced comprising:
   (a) providing a curved timing plate having a series of unevenly spaced reflective markings representative of evenly spaced spot positions on said flat surface,
   (b) scanning said curved timing plate with a rotating beam of light, said rotating beam of light moving in synchronization with said modulated laser beam, and
   (c) sensing the light reflected by said reflective markings on said timing plate and converting said sensed light into a stream of electrical signals.

2. The method of claim 1 and further including converting said stream of electrical signals into a series of electrical pulses.

3. In a laser recording system in which a beam of laser light is modulated with digital signals and deflected by a rotating mirror onto a recording surface and wherein the recording surface is flat over the area exposed to said modulated beam of laser light, the improvement comprising:
   (a) means for providing a continuous beam of light rotating in synchronization with said modulated beam of laser light;
   (b) a curved timing plate positioned to receive said continuous beam of light, said curved timing plate having a series of unevenly spaced reflective markings representative of linearly spaced spot positions on said recording surface,
   (c) sensing means for detecting said light reflected off said reflective markings of said curved timing plate and producing signals in accordance therewith, and
   (d) means for regulating the flow of said digital signals to said modulating means in response to said signals,
   (e) whereby, said light spots formed on said recording surface from said digitized beam are evenly spaced.

4. Apparatus as defined in claim 3 and wherein said means for providing said continuous beams of light is a laser.

5. Apparatus as defined in claim 3 and wherein said recording surface is the surface of a photoconductive drum.

6. Apparatus as defined in claim 3 and wherein said timing plate is arcuate shaped.

7. Apparatus as defined in claim 6 and wherein said sensing means is positioned around the center of curvature of said curved timing plate.

8. Apparatus as defined in claim 7 and wherein said curved timing plate is a segment of a cylinder.

9. Apparatus as defined in claim 8 and wherein said reflective markings on said timing plate are separated by non-reflective areas.

10. Apparatus as defined in claim 7 and wherein said regulating means comprises a timing generator.

11. A laser recording system comprising:
   (a) a laser for generating a beam of light,
   (b) means for splitting said beam of light into first and second beams,
   (c) a light sensitive recording surface,
   (d) a curved timing plate having alternating reflective and non-reflective portions,
   (e) optical scanning means for receiving said first and second beams and causing said first beam to scan across said light sensitive recording surface and said second beam to scan across said target simultaneously,
   (f) said recording surface being substantially flat over the area exposed to said first light beam,
   (g) a modulator for modulating said first light beam,
   (h) a source of modulating signals for controlling said modulator,
   (i) gating means for controlling said flow of signals to said modulator, and
   (j) photodetector means positioned to receive light reflected from said timing plate produce electrical signals in response thereto for controlling said gating means,
   (k) said reflective portions on said timing plate being spaced so as to provide even spacing of the light pulses impinging on said light sensitive recording surface by said first beam.

12. The laser recording system of claim 11 and wherein said timing plate comprising an aluminized strip of mylar.

13. Apparatus for generating timing signals for compensating for changes in the angular velocity of a rotating modulated laser beam as it is swept across a flat recording surface comprising:

(a) means providing a continuous beam of light, (b) a curved timing plate having a series of unevenly spaced reflective markings representative of evenly spaced spot positions on said recording surface, (c) optical scanning means for causing said continuous beam of light to be swept across said curved timing plate in synchronization with said modulated laser beam, (d) means for sensing the light reflected off said reflective markings on said curved timing plate and producing electrical timing signals in response thereto.

* * * * *